United States Patent Office 2,722,326
Patented Nov. 1, 1955

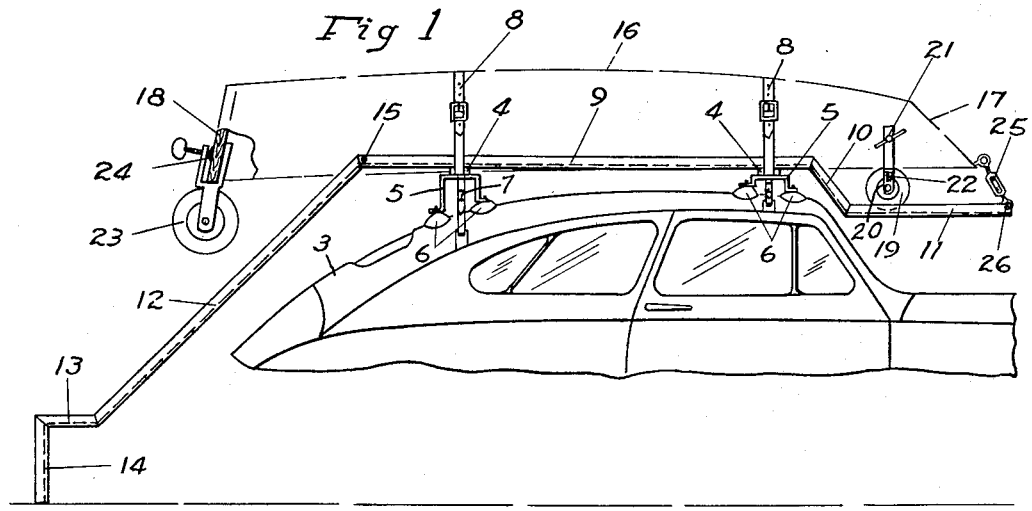
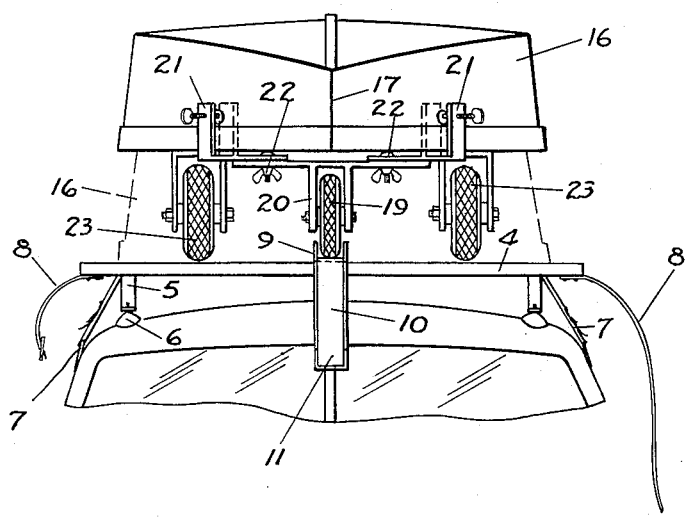
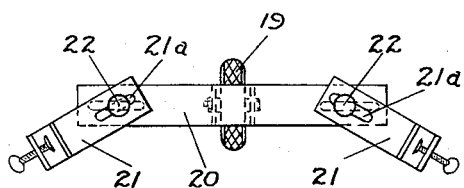

2,722,326

BOAT CARRIER ATTACHMENT FOR AUTOMOBILES

Anthony M. Conroy, St. Paul, Minn.

Application September 4, 1953, Serial No. 378,643

3 Claims. (Cl. 214—450)

This invention relates to improvements in carriers adapted to facilitate the loading of boats on and unloading them from the tops of automobiles.

It is an object of my invention to provide a simple and inexpensive device of this class having a guide rail adapted to be secured to load carrying structures of the types commonly used on the tops of automobiles and a wheel adapted to be secured to the boat to be carried in position to movably support it on the rail and to guide it along the rail during loading and unloading operations.

A further object is to provide in a device of the class described a single guide rail adapted to extend longitudinally of the top of an automobile to coact with a wheel mounted on the boat to support and guide the boat to and from the traveling position on the automobile.

My invention also includes certain other novel features of construction which greatly facilitate the raising and lowering of the boat and movement thereof to and from loaded or traveling position while guarding against damage to the automobile and boat.

It is customary to carry small boats on the tops of hard topped vehicles and a number of different types of load carrying structures adapted to be secured to the tops of vehicles for this and other purposes are in widespread use. One of the most popular of such load carrying structures comprises a pair of rigid load carrying bars extending crosswise of the top and supported on vacuum cup members which detachably engage the vehicle top with a minimum of damage to the top. Boats and other loads are usually secured to these cross bars by adjustable straps and the bars are held in place by flexible fastening members which are detachably connected to the gutters of the vehicle tops. My improved loading and unloading device is particularly, although not exclusively, adapted to be secured to a load carrying structure of this type.

Referring to the accompanying drawing which illustrates by way of example and not for the purpose of limitation, a preferred embodiment of my invention:

Figure 1 is a side elevational view showing my device in place on the top of an automobile of common type, the traveling position of the boat being indicated partially in broken lines and partially in section;

Fig. 2 is a front elevational view showing my device in place on the vehicle and showing the boat in full lines in an intermediate, partially loaded position and in broken lines in loaded or traveling position, and Fig. 3 is a top plan view of the bow wheel support and clamps.

In the drawing the top portion of a vehicle of common type is indicated at 3. A suitable load carrying structure attached to the top of the vehicle comprises a pair of rigid bars 4 extending across the top and supported thereon in suitable manner. Each bar 4 may be supported on a pair of brackets 5 carrying vacuum cups 6 for engagement with the vehicle top. As shown in Fig. 2, the bars 4 may also be secured to the vehicle by means of straps 7 having hook members engaging the vehicle top gutter members in the usual or suitable manner. Also attached to the bars 4 at each end are strap members 8 for confining the load on the bars.

My improved loading and unloading device comprises a guide rail having a main portion 9 adapted to extend substantially horizontally and longitudinally of the vehicle and to be secured centrally to each of the load carrying bars 4. Projecting forwardly from the front end of the rail 9 is an inclined portion 10 and a horizontal, downwardly offset portion 11 extending in continuation of the main portion 9 and rigidly connected thereto. Detachably connected to the rear end of the portion 9 is an inclined extension 12 of the rail having a shoulder portion 13 and a leg portion 14. The lower end of the portion 14 may rest on the ground at the rear of the vehicle when the rail is in use. The several portions 9, 10 and 11 of the rail and the extension 12 thereof are channel shaped in cross section, being provided with guide flanges at each side which project upwardly. A removable bolt 15 is provided to connect the rear end of the portion 9 to the upper end of the extension 12 so that the latter may be removed and stored when not required for the loading or unloading operation.

A boat, indicated generally by the numeral 16, is shown in its inverted or bottom-up position and is of the common type having a pointed bow 17 and a substantially square stern 18. Removably secured to the boat near the bow end thereof is a small anti-friction wheel 19 adapted to roll along the guide rail between the flanges thereof. This wheel 19 is preferably supported on a forked bracket member 20 which is adapted to be removably secured to the boat 16. For a boat which is open to a point near the bow, the bracket 20 may be secured to the boat by a pair of screw clamps 21 engaging the gunwales of the boat at each side near the bow. These clamps are adjustable laterally to fit gunwales of various widths, being connected to the bracket 20 by wing bolts 22 each engaging members of the bracket and one of the clamps and extending through elongated slots 21a in the relatively extensible members as shown in Fig. 3. For boats which are decked over near the bow, the bracket 20 may be secured directly to the deck in suitable position by the use of screws or bolts.

To further facilitate the movement of the boat to and from the vehicle, I provide a pair of wheels 23 which may be secured to the stern 18 of the boat in suitable manner. For example, each wheel may be secured in place by a screw clamp 24. When the boat is in loaded or traveling position on the carrier, the bow may be secured to the rail portion 11 by means of a tension member 25 which may comprise a turnbuckle and hook connection with a pin 26 carried by the rail portion 11. Otherwise a short piece of cord or rope may be used to fasten the bow of the boat to the front end portion of the rail.

Preparatory to loading the boat, the wheel 19 is secured in suitable manner to the boat near the bow and if the wheels 23 are to be used, they may be secured to the stern of the boat. The boat is then turned bottom side up and moved to a position rearwardly of the vehicle and in alignment with the guide rail on the load carrier. The bow of the boat is then lifted and the wheel 19 placed on the shoulder portion 13 of the rail. The operator then goes to the stern of the boat and lifts it with forward thrust so that the boat is lifted and moved forwardly while the bow end supported on the wheel 19, and under the guidance of the rail, is moved to a position such as that indicated in Fig. 1. A minimum of effort is thus required to move the wheel 19 up the inclined portion 12 along the substantially horizontal portion 9 and then down the portion 10 and along the portion 11. The wheel 19 in moving from the rail portion 9 down the portion 10 causes the bow of the boat to be lowered sufficiently to bring the gunwales to rest on the carrier bars 4, as indicated in broken lines in Figs. 1 and 2. The member 25 may then be attached and placed under tension so that the front end portion of the rail is secured in relation to the boat and wheel 19. The straps 8 are fastened over the boat in the usual manner to secure it in place. Finally, the rail extension 12 is detached from the rail portion 9 by removing the bolt 15 and may be carried on the bars 4 at one side of or beneath the boat until required for unloading purposes.

Obviously the unloading of the boat is accomplished by procedure in which the foregoing is reversed. After freeing the straps 18 and fastening 25 from the boat, the operator merely grasps the stern of the boat and draws it rearwardly until the wheel 19 rests on the rear end of the rail portion 9 or shoulder 13. The wheels 23 are then lowered to the ground and by grasping its bow end portion the boat may be wheeled to the site where it is to be launched.

Since only one end of the boat must be lifted by hand, a minimum of effort is required and both loading and unloading operations may be accomplished quickly and easily. Use of the rail extension 12 is not essential because even without this member the raising and lowering operations may be performed easily by a single person. In this case, the wheel 19 carried by the bow end portion of the boat is merely placed in engagement with the rear end of the main portion 9 of the rail preparatory to loading while the stern of the boat is supported on the ground at the rear of the vehicle, either directly or on the wheels 23. Thereafter the procedure is identical with that followed when the rail extension member 12 is used. It will also be evident that the use of the wheels 23 is optional.

Having described my invention, what I claim as new and desire to protect by Letters Patent is:

1. For a vehicle having a top and a load supporting structure mounted on said top, a boat loading and unloading device comprising a rail extending centrally along said structure, a wheel adapted to be attached to a boat to be carried on said structure near the bow end thereof and to coact with said rail in movably supporting the bow end portion of the boat during movement thereof to and from loaded position on the vehicle and a pair of wheels adapted to be secured to the stern end of the boat and to project downward therefrom when the boat is in bottom-up position to facilitate the movement of the boat to and from the vehicle.

2. For a vehicle having a top and a load supporting structure mounted on said top, a boat loading and unloading device comprising a rail adapted to extend centrally along said structure and having a main substantially horizontally elongated portion, a forwardly projecting elongated substantially horizontal portion and an inclined portion connecting said main portion to said forwardly projecting portion whereby the last mentioned portion of the rail is downwardly offset relative to the main portion of the rail, and a wheel adapted to be mounted on the boat and movable along said portions of the rail to raise and lower the boat when supported on said wheel and rail and moved along the rail.

3. A boat loading and unloading device in accordance with claim 1 wherein the forwardly projecting portion of said rail is provided with means for connecting it to the forward end of a boat carried by said device.

References Cited in the file of this patent

UNITED STATES PATENTS

| | | |
|---|---|---|
| 2,247,128 | Levey | June 24, 1941 |
| 2,361,592 | Bjork | Oct. 31, 1944 |
| 2,412,162 | Lindblom | Dec. 3, 1946 |
| 2,654,515 | Svoboda | Oct. 6, 1953 |
| 2,663,473 | McMillan | Dec. 22, 1953 |